(12) United States Patent
Noguchi et al.

(10) Patent No.: US 10,375,345 B2
(45) Date of Patent: Aug. 6, 2019

(54) CAMERA IMAGE DISPLAY APPARATUS

(71) Applicant: Honda Motor Co., Ltd., Tokyo (JP)

(72) Inventors: Junpei Noguchi, Wako (JP); Mitsugu Tosa, Wako (JP); Kazuhiko Kameda, Wako (JP); Yuji Yokota, Wako (JP); Yusuke Takahashi, Wako (JP); Hiroshi Iwami, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 112 days.

(21) Appl. No.: 15/699,636

(22) Filed: Sep. 8, 2017

(65) Prior Publication Data

US 2018/0091761 A1    Mar. 29, 2018

(30) Foreign Application Priority Data

Sep. 28, 2016 (JP) ................. 2016-188963

(51) Int. Cl.
*H04N 5/63* (2006.01)
*B60R 1/00* (2006.01)
*B60R 16/033* (2006.01)
*H04N 5/232* (2006.01)
*B60R 16/03* (2006.01)

(52) U.S. Cl.
CPC ............ *H04N 5/63* (2013.01); *B60R 1/00* (2013.01); *B60R 16/03* (2013.01); *B60R 16/033* (2013.01); *H04N 5/23241* (2013.01); *H04N 5/23293* (2013.01); *B60R 2300/404* (2013.01)

(58) Field of Classification Search
CPC ......... B60R 16/03; B60R 16/033; B60R 1/00; B60R 2300/404; H04N 5/23241; H04N 5/23293; H04N 5/63
USPC ......................................................... 348/148
See application file for complete search history.

(56) References Cited

FOREIGN PATENT DOCUMENTS

| JP | 2006-027307 | * | 2/2006 |
| JP | 2007261532 | * | 10/2007 |
| JP | 2007261532 A | | 10/2007 |
| JP | 2016164010 | * | 9/2016 |

* cited by examiner

*Primary Examiner* — Jamie J Atala
*Assistant Examiner* — Kathleen V Nguyen
(74) *Attorney, Agent, or Firm* — Duft & Bornsen, PC

(57) ABSTRACT

A camera image display apparatus including a display request output part outputting a display request of camera images, a power supply part supplying power to a display unit, and a power supply control unit controlling flow of electricity so as to supply activating power from the power supply part to the display unit at a first time point within a predetermined time from a completion of an engine starting, when the display request is output by the display request output part at the first time point, and to supply activating power from the power supply part to the display unit at a second time point after lapse of the predetermined time, when the display request is not output within the predetermined time from the completion of the engine starting.

9 Claims, 6 Drawing Sheets

CAMERA IMAGE DISPLAY APPARATUS

CROSS-REFERENCE TO RELATED APPLICATION

This application is based upon and claims the benefit of priority from Japanese Patent Application No. 2016-188963 filed on Sep. 28, 2016, the content of which is incorporated herein by reference.

BACKGROUND OF THE INVENTION

Field of the Invention

This invention relates to a camera image display apparatus configured to display a camera image taken by a camera mounted on a vehicle.

Description of the Related Art

Conventionally, in order to display a camera image on a monitor device immediately after engine starting, there is a known apparatus of this type, in which battery power is supplied to a camera and an image processing device in response to an operation of a door key prior to the engine starting and thereby the camera and image processing device is put in activated state or standby state in advance of the engine starting. Such an apparatus is described in Japanese Unexamined Patent Publication No. 2007-261532 (JP2007-261532A), for example.

However, when power is supplied from the battery to the camera and image processing device prior to engine starting as in the apparatus described in JP2007-261532A, engine starting performance is susceptible to degradation owing to insufficient supply of power to a starting motor at the time of engine starting. An apparatus that can promptly display camera images without degrading starting performance is therefore desirable.

SUMMARY OF THE INVENTION

An aspect of the present invention is a camera image display apparatus, comprising: a display unit including a camera mounted on a vehicle to photograph surroundings of the vehicle and a monitor configured to display a camera image taken by the camera; a display request output part configured to output a display request of the camera image; a power supply part configured to supply an electrical power to the display unit; and a power supply control unit configured to control a flow of an electricity from the power supply part to the display unit, wherein the power supply controller controls the flow of the electricity so as to supply an activating power from the power supply part to the display unit at a first time point within a predetermined time from a completion of a start of an engine mounted on the vehicle, when the display request is output at the first time point by the display request output part, and so as to supply the activating power from the power supply part to the display unit at a second time point after a lapse of the predetermined time, when the display request is not output within the predetermined time from the completion of the start of the engine.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereinafter, an embodiment of the present invention is explained with reference to FIGS. 1 to 5.

Figure 1:
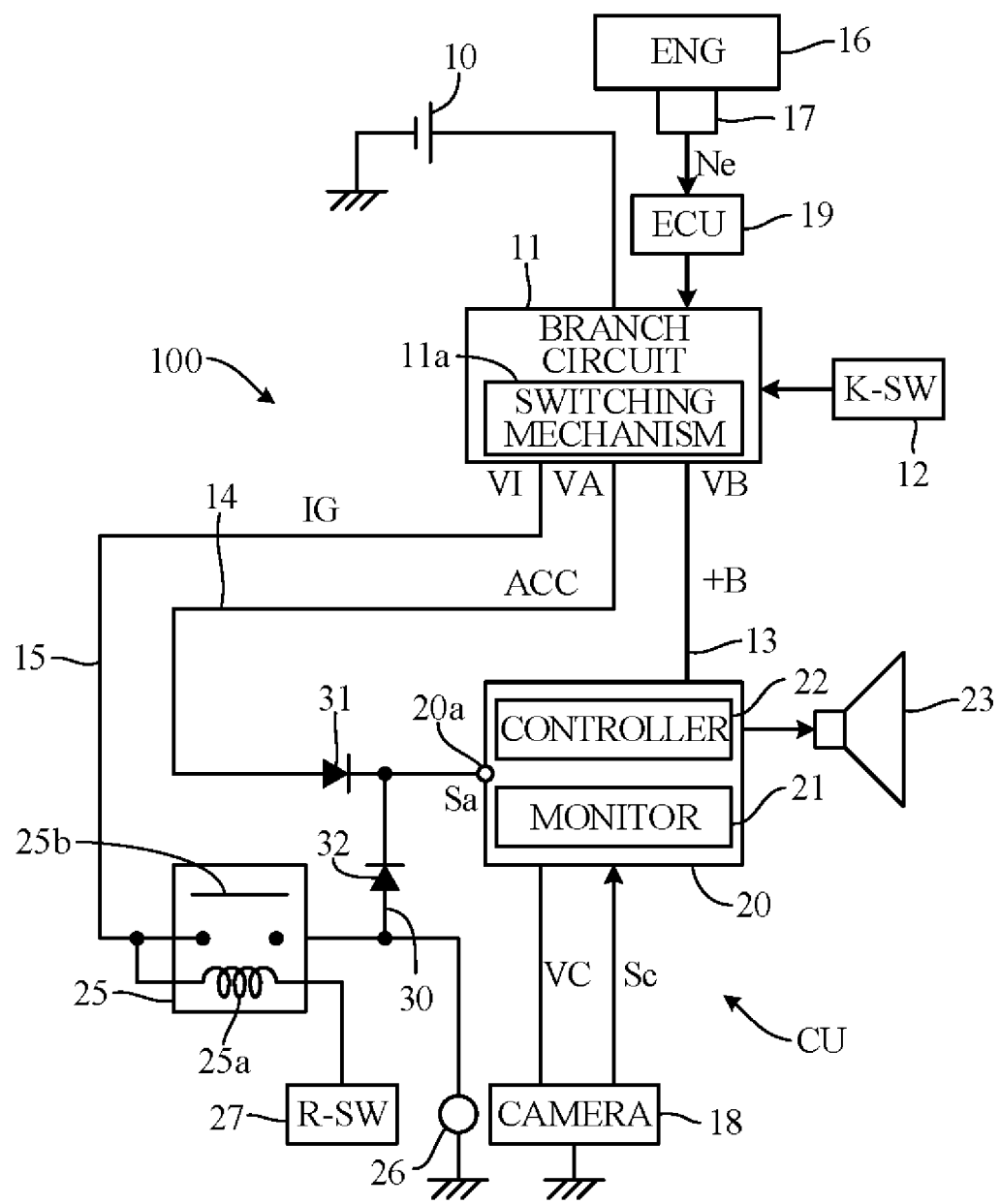
FIG. 1 is a diagram showing an overview of a configuration of a camera image display apparatus according to an embodiment of the present invention.

FIG. 1 is a diagram showing an overview of the configuration of a camera image display apparatus 100 according an embodiment of the present invention, with primary focus on its power supply system. This camera image display apparatus 100 is configured to display camera images taken by an onboard vehicle camera on a navigation unit monitor.

As shown in FIG. 1, a branch circuit 11 is connected to an onboard battery 10 of predetermined rated voltage (e.g., 12V). The branch circuit 11 branches into multiple power supply lines (+B line 13, ACC line 14 and IG line 15), and the battery 10 can implement battery power supply VB, accessory power supply VA and ignition power supply VI on the respective power lines 13 to 15. The branch circuit 11 has a switching mechanism (e.g., a relay) 11a that switches in response to operation of a key switch 12 by a driver. The key switch 12 is, for example, a rotary switch built to be operable sequentially from Off position to ACC position, IG position and Start position. Alternatively, the key switch 12 can be configured as a push switch.

The +B line 13 is constantly connected to the battery 10 and is supplied with battery power supply VB power irrespective of the position of the key switch 12, namely, even when the key switch 12 is in Off position. In other words, the branch circuit 11 is configured so that the +B line 13 is connected to the battery 10 without passing through the switching mechanism 11a. On the other hand, the branch circuit 11 is configured so that the ACC line 14 and the IG line 15 are connected to the battery 10 through the switching mechanism 11a. When the key switch 12 is placed in Off position, the ACC line 14 and IG line 15 are cut off from the battery 10. When the key switch 12 is put in ACC position, the ACC line 14 is connected to the battery 10, and accessory power supply VA power is supplied to the ACC line 14. When the key switch 12 is put in IG position, the ACC line 14 and the IG line 15 are connected to the battery 10, and accessory power supply VA power is supplied to the ACC line 14 and ignition power supply VI power to the IG line 15.

When the key switch 12 is put in Start position, an engine-start instruction is issued and the battery 10 is connected to a starter motor (not shown). As a result, power from the battery 10 is supplied to the starter motor to drive the starter motor and start an engine 16. In order to enhance starting performance of the engine 16 at this time, the switching mechanism 11a operates to cut off supply of accessory power supply VA power to the ACC line 14. Power of the battery 10 is therefore preferentially supplied to the starter motor.

After the engine-start instruction is issued, the key switch 12 is returned to IG position from Start position. The switching mechanism 11a is connected to an ECU (Electronic Control Unit) 19 and operates in response to signals from the ECU 19. The ECU 19 has at least a processor and a memory and detects based on a signal Ne from an engine speed sensor 17 for detecting engine speed that engine speed has reached a predetermined full-firing speed indicating completion of engine 16 starting. After passage of predetermined time period Δt1 (e.g., 700 ms) following detection of engine start completion, the switching mechanism 11a operates in response to a command from the ECU (processor) 19 to resume supply of accessory power supply VA power from the battery 10 to the ACC line 14. Predetermined time period Δt1 includes predetermined delay due to communication with, inter alia, the ECU 19 (about 200 ms, for example).

A navigation unit 20 is connected to the +B line 13. In this connection, supply of battery power supply VB power to the navigation unit 20 is prohibited until a later-explained activating signal Sa is input. Although not shown in the drawings, units operable when the key switch 12 is in Off position, such as a clock and keyless entry device, are connected to the +B line 13. A camera 18 having a CCD, CMOS or other image sensor, specifically a rear camera (back camera) in the present embodiment, is connected to the navigation unit 20. The camera 18 is therefore mounted on the rear of the vehicle to look diagonally downward from above on the road surface behind the vehicle and photograph an imaging region within a viewing angle rearward of the vehicle. The camera 18 commences imaging after the camera has been activated, more exactly after activation processing is finished, and outputs an image signal Sc to the navigation unit 20.

The navigation unit 20 has a monitor 21 for displaying camera images from the camera 18. Various information from a navigation system, television images from a TV receiver, and other kinds of images can also be displayed on the monitor 21. A controller 22 equipped with at least a processor and a memory controls various operations of the navigation unit 20, including, for example, display of images on the monitor 21. After navigation has been activated, more exactly, after activation processing is finished, the navigation unit 20 can display various images, including camera images, on the monitor 21. Processing time required for activating the navigation unit 20 is, for example, longer than processing time required for activating the camera 18 (see FIG. 4).

The navigation unit 20 is configured to supply battery power supply VB power received by the navigation unit 20 to the camera 18 as camera power VC. In other words, the camera 18 commences activation processing conjointly with the navigation unit 20. In combination, the camera 18 and the navigation unit 20 constitute a camera image display unit CU.

The navigation unit 20 includes a radio, CD player, DVD player, digital audio player and so on, whose voice content is also used for car audio output from a speaker(s) 23 installed inside the vehicle. In other words, the navigation unit 20 also functions as an audio device.

The ACC line 14 is connected through a diode 31 to an input terminal 20a of the navigation unit 20. A signal (activating signal Sa) is input to the input terminal 20a from the accessory power supply VA. Although not shown in the drawings, various electrical accessories are also connected to the ACC line 14 as amenities.

The controller (processor) 22 determines input or not of the activating signal Sa, and when input of the activating signal Sa is confirmed, permits supply of battery power supply VB power to the navigation unit 20. As a result, the navigation unit 20 begins activation processing, and the camera 18 begins activation processing conjointly with the navigation unit 20. In addition, controller (processor) 22 determines input or not of the image signal Sc from the camera 18, and when input of the image signal Sc is confirmed, image display on the monitor 21 is switched to display the camera image. After activation of the navigation unit 20, input of the activating signal Sa to the input terminal 20a is stopped, whereupon the controller 22 cuts off supply of battery power supply VB power to the navigation unit 20.

Back lights 26 installed at left and right rear corners of the vehicle are connected through a reverse relay 25 to the IG line 15. A coil 25a of the relay 25 is connected to a reverse switch 27 that turns ON (operates) when reverse speed stage is established in a transmission (not illustrated). The transmission is a manual transmission, for example. Alternatively, it can be an automatic transmission. The reverse switch 27 is configured as a switch that turns ON when a shifter (e.g., shift lever) is put in reverse position. Although not illustrated, an engine ECU etc. for performing engine control is connected to the IG line 15, and ignition power supply VI also serves as engine starting power supply.

When the reverse switch 27 is OFF (inoperative), the coil 25a of the relay 25 is de-energized, and a switch 25b of the relay 25 is opened, as seen in the drawing. This simultaneously extinguishes the back lights 26. When the reverse switch 27 turns ON, the coil 25a is energized by ignition power supply VI power and the relay switch 25b closes. Since this causes supply of ignition power supply VI power to the back lights 26, the back lights 26 turn ON.

The ACC line 14 segment between the diode 31 and input terminal 20a and the IG line 15 segment between the relay 25 and back lights 26 are connected through a connection line 30. A diode 32 is interposed in the connection line 30. Therefore, when the reverse switch 27 turns ON and causes the relay switch 25b to close, ignition power supply VI power is supplied to the back lights 26 and, in addition, the activating signal Sa is supplied from ignition power supply VI to the input terminal 20a via the diode 32.

Thus, in the present embodiment, the activating signal Sa of the navigation unit 20 and camera 18 is supplied to the input terminal 20a by the reverse switch 27 turning ON. Therefore, the reverse switch 27 serves a function of outputting display requests of camera image. Alternatively, a switch that operates conjointly with the reverse switch 27 can be constituted other than by the relay 25. In other words, the switch provided in the IG line 15 on the upstream side of the connection line 30 (between the connection line 30 and the branch circuit 11) can be one other than the relay insofar as it turns ON (closes) together with the reverse switch 27.

Figure 2:
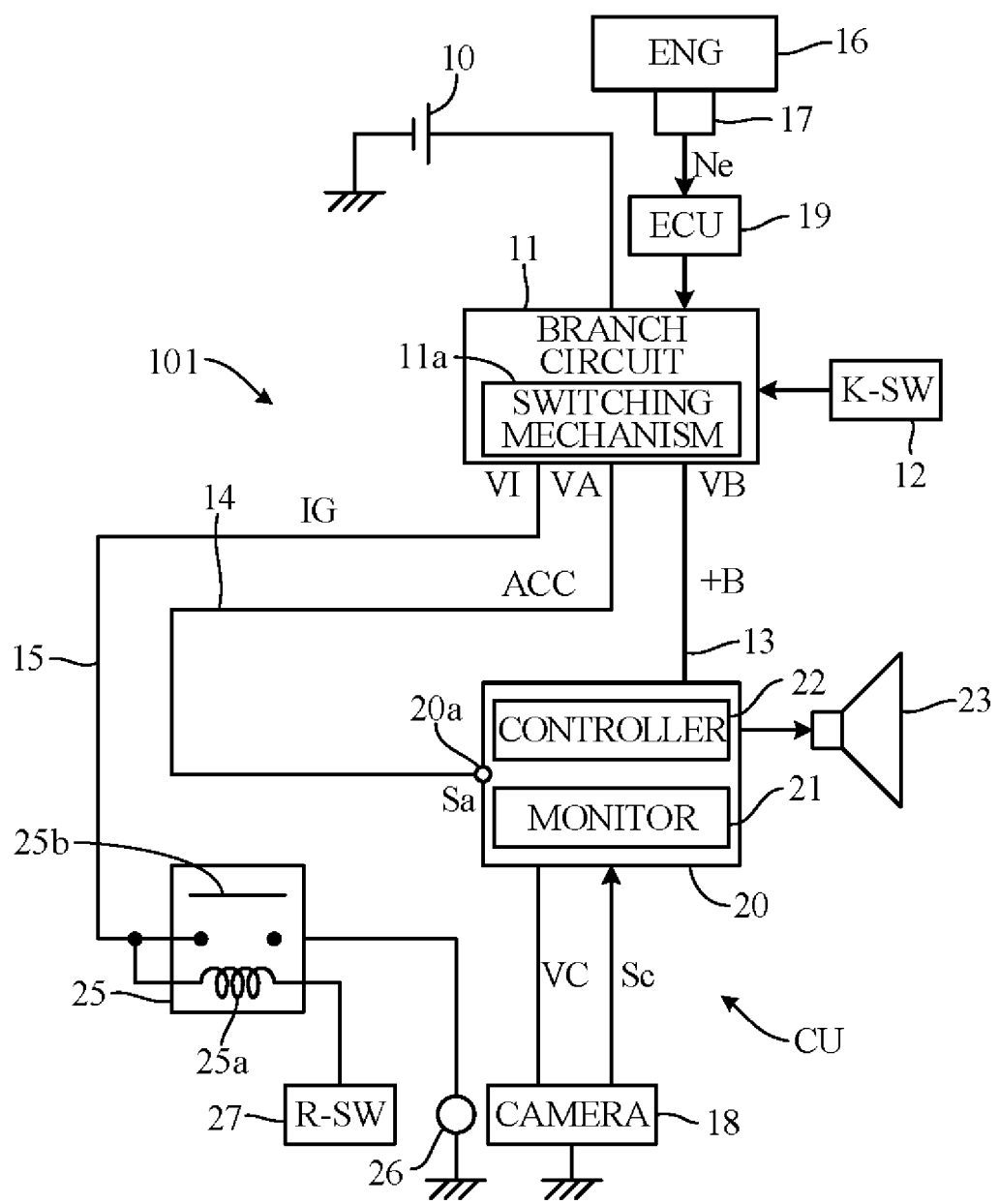
FIG. 2 is a diagram showing a comparison of FIG. 1.
Figure 3:
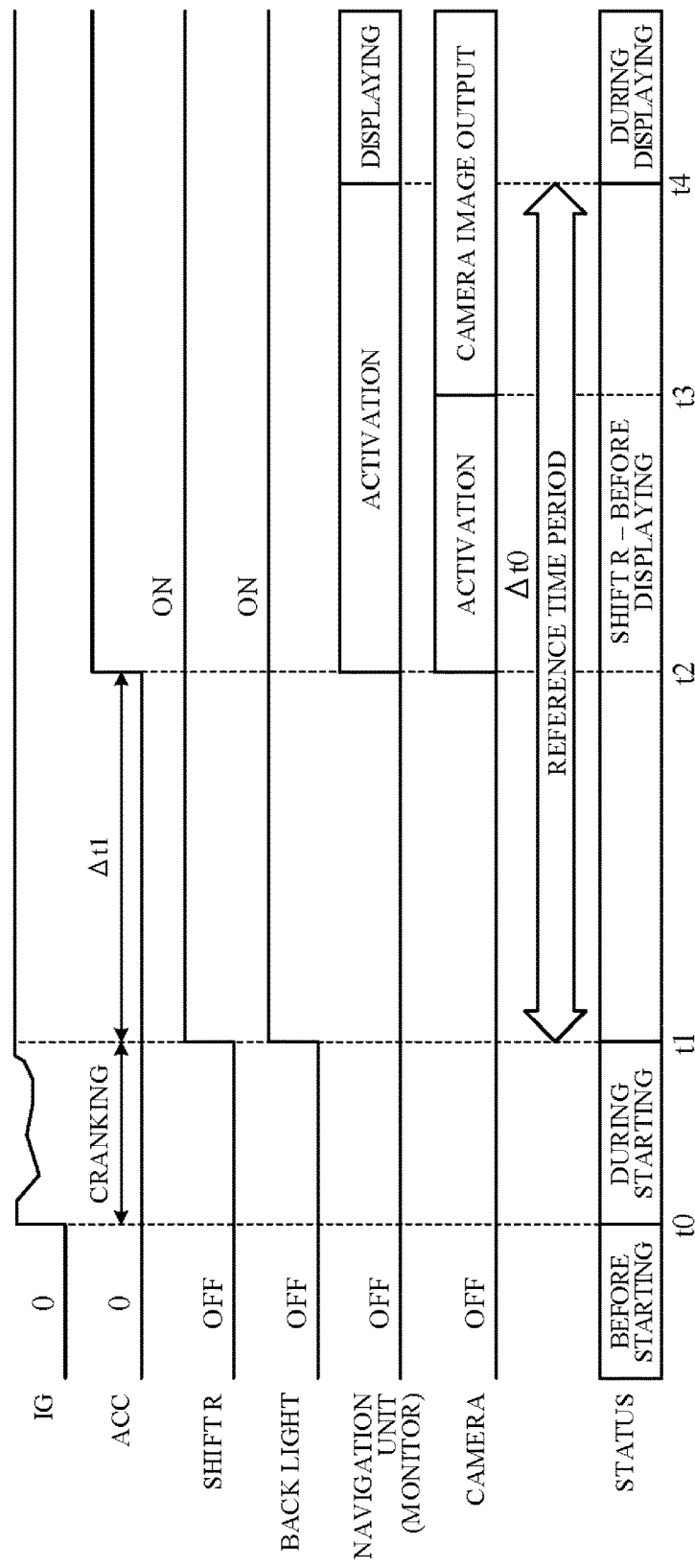
FIG. 3 is a timing chart showing an example of an operation by the comparison of FIG. 2.

FIG. 2 is a diagram showing configuration of a camera image display apparatus 101 presented here as an example for comparison with the apparatus of FIG. 1. Portions in common with those of FIG. 1 are assigned like reference symbols. In FIG. 2, differently from in FIG. 1, the pair of diodes 31 and 32 and the connection line 30 are omitted, and only the activating signal Sa from accessory power supply VA is supplied to the input terminal 20a. Operation of the comparative camera image display apparatus 101 is explained first. FIG. 3 is a timing chart showing an example of operation of the camera image display apparatus 101.

Upon operation of the key switch 12 at time t0, inrush current flowing from the battery 10 to the starter motor initiates cranking. At this point, the switching mechanism 11a of the branch circuit 11 of FIG. 2 is switched and ignition power supply VI voltage rises. On the other hand, with a view to enhancing starting performance of the engine 16, power is not supplied to the ACC line 14, so that accessory power supply VA voltage is zero.

When, at time t1, starting of the engine 16 is completed as indicated by the engine having reached predetermined full-firing speed, the ECU 19 starts a timer. At this point, should the reverse switch 27 be turned ON by a shifter operation that shifts the transmission to reverse speed stage, the relay switch 25b closes. As a result, ignition power supply VI power is supplied to the back lights 26 and the back lights 26 turn ON.

When time counted by the ECU 19 reaches predetermined time period $\Delta t1$ at time t2, voltage of the accessory power supply VA rises and the activating signal Sa is input through the ACC line 14 to the input terminal 20a of the navigation unit 20. As a result, battery power supply VB power is supplied to the navigation unit 20 and the navigation unit 20 commences activation processing. At this point, camera power VC is supplied through the navigation unit 20 to the camera 18, whereby the camera 18 also commences activation processing.

Since accessory power supply VA power is thus cut off until predetermined time period $\Delta t1$ elapses following engine start completion, power can be preferentially supplied from the battery 10 to the starter, thereby improving starting performance of the engine 16. Moreover, the cut-off of accessory power supply VA power disables the navigation unit 20, thereby preventing emission of radio noise from the speaker(s) 23 at the time of engine starting.

When activation processing of the navigation unit 20 is completed at time t4 following completion of activation processing of the camera 18 at time t3, the controller 22 switches image display on the monitor 21 in response to input of image signal Sc of the camera 18. In other words, the camera image is displayed on the monitor 21 upon input of the image signal Sc.

Given that, in order to facilitate prompt start of vehicle reverse driving, a camera image display requirement is set requiring camera image display within predetermined reference time period $\Delta t0$ (e.g., 2 sec) following shifting of the shifter to reverse speed stage, such requirement should preferably be met with ample time to spare. However, in the above comparative example explained in contrast with the present embodiment, activation processing of the navigation unit 20 is started upon passage of predetermined time period $\Delta t1$ following engine start completion. Since a risk therefore arises of, for example, reference time period $\Delta t0$ elapsing when activation processing of the navigation unit 20 is completed at time t4, an ample time margin for satisfying the camera image display requirement is difficult to secure. To the contrary, in the present embodiment, activation processing of the navigation unit 20 is completed early, as explained below, so that an ample time margin is available for satisfying the camera image display requirement.

Figure 4:
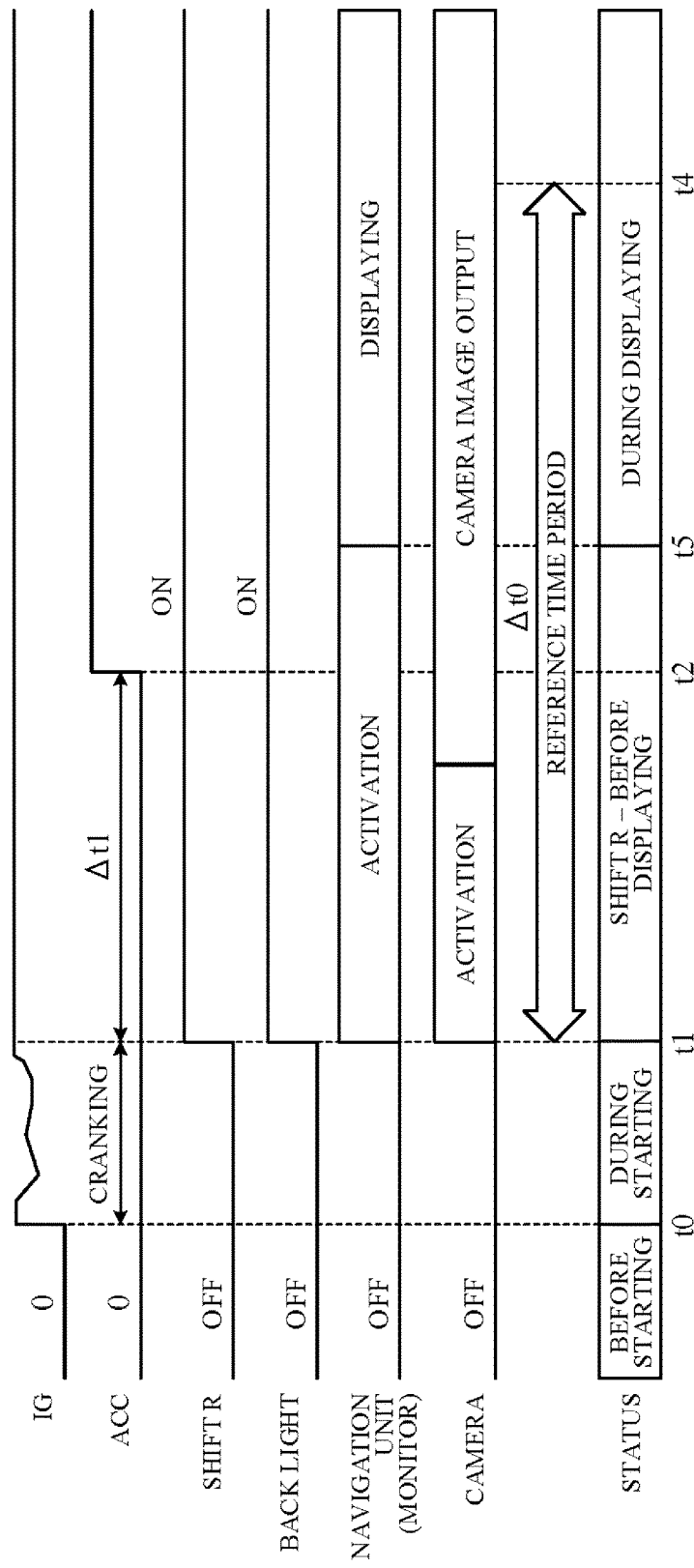
FIG. 4 is a timing chart showing an example of an operation by the camera image display apparatus according to the embodiment of the present invention.

FIG. 4 is a timing chart showing an example of an operation of the camera image display apparatus 100 in accordance with this embodiment of the present invention. In the present embodiment (FIG. 1), activating signal Sa from the ignition power supply VI is input through the diode 32 to the input terminal 20a of the navigation unit 20 when the relay switch 25b turns ON owing to shift to reverse speed stage of the transmission. Therefore, as shown in FIG. 4, activation processing of the navigation unit 20 and activation processing of the camera 18 are started simultaneously with shifting of the shifter to reverse speed stage at time t1.

Activation processing of the navigation unit 20 is therefore completed at time t5 somewhat earlier than time t4. As a result, a camera image is displayed on the monitor 21 before reference time period $\Delta t0$ elapses following shifting of the shifter to reverse speed stage, whereby the camera image display requirement can be satisfied with ample time to spare. Therefore, the driver can view the camera image on the monitor 21 immediately after shifting to reverse, and promptly drive the vehicle in reverse.

Figure 5:
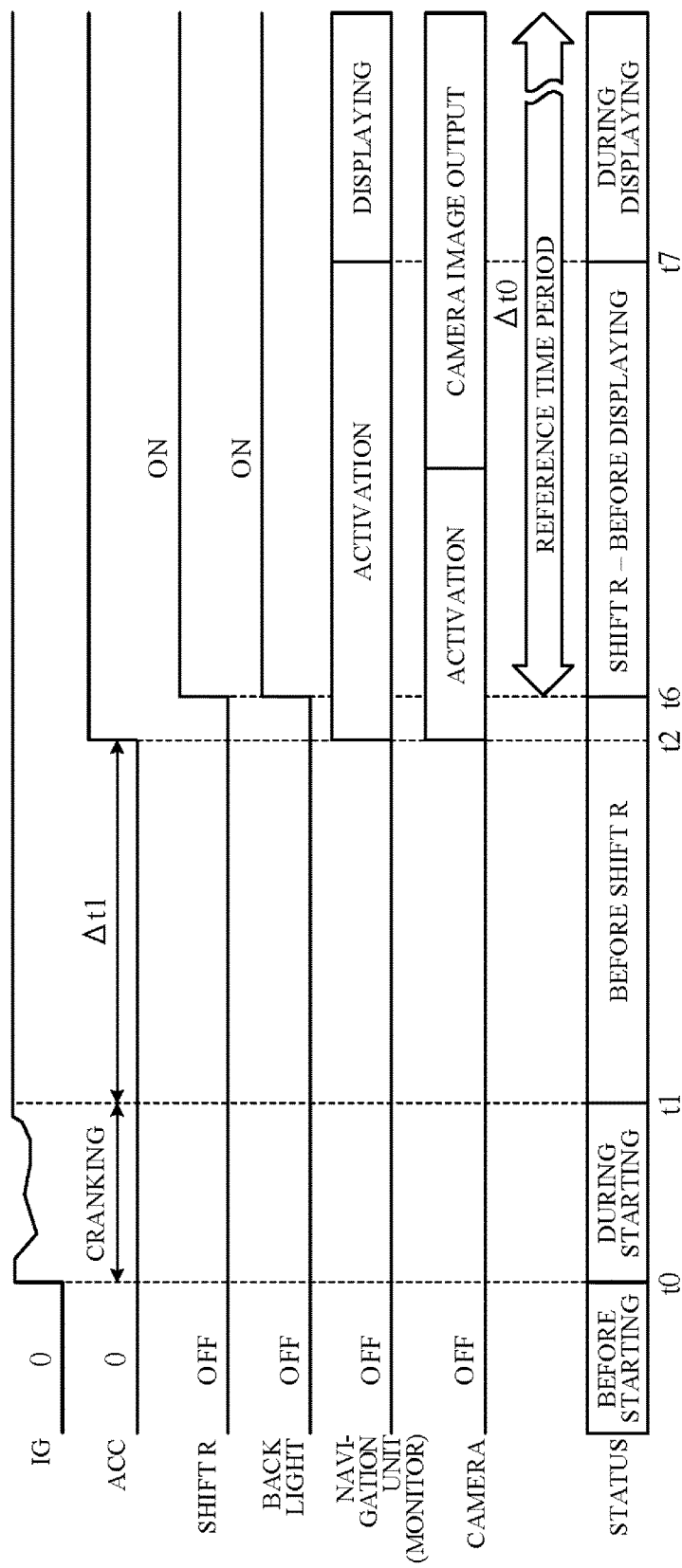
FIG. 5 is a timing chart showing an example of another operation by the camera image display apparatus according to the embodiment of the present invention.

FIG. 5 is a timing chart showing an example of another operation of the camera image display apparatus 100 in accordance with this embodiment of the present invention. FIG. 5 shows an example of operation in a case where the transmission is shifted to reverse speed stage at a time later than time t2 after elapse of predetermined time period $\Delta t1$ following engine start completion.

As shown in FIG. 5, accessory power supply VA voltage rises at time t2, whereby the activating signal Sa from accessory power supply VA is input through the diode 31 to the input terminal 20a of the navigation unit 20 at time t2. As a result, activation processing of the navigation unit 20 and activation processing of the camera 18 are simultaneously started at time t2 prior to the transmission being shifted to reverse speed stage. After this, when the transmission is shifted to reverse speed stage and the reverse switch 27 is turned ON at time t6, ignition power supply VI power is supplied to the back lights 26 and the back lights 26 turn ON. In this case, a camera image is displayed on the monitor 21 at time t7 prior to elapse of reference time period $\Delta t0$ following shifting to reverse speed stage. Therefore, the camera image display requirement can be satisfied with ample time to spare.

This embodiment of the present invention can achieve advantages and effects such as the following:

(1) The camera image display apparatus 100 includes: a camera image display unit CU including a camera 18 mounted on a vehicle to photograph surroundings of the vehicle and a monitor 21 for displaying camera images taken by the camera 18; a reverse switch 27 for outputting display requests of the camera images upon shifting of a transmission to reverse speed stage; a battery power supply VB, the accessory power supply VA and the ignition power supply VI for supplying power to the camera image display unit CU (camera 18 and navigation unit 20); an ECU 19, branch circuit 11, diodes 31, 32 and controller 22 for controlling flow of electricity from the power supplies VB, VA and VI to the camera image display unit CU (FIG. 1). Moreover, the ECU 19, the branch circuit 11, the diodes 31 and 32, and the controller 22 of the navigation unit 20 control the flow of electricity from power supplies VB, VA and VI so as to supply activating power to the camera image display unit CU (individually to the camera 18 and navigation unit 20) at time t1 within a predetermined time period $\Delta t1$ from detection of completion of engine 16, when the display request is output from the reverse switch 27 at time t1 (FIG. 4), and to supply activating power to the camera image display unit CU at time t2 after lapse of the predetermined time period $\Delta t1$ from engine start completion, when the display request is not output within the predetermined time period $\Delta t1$ from detection of completion of engine 16 starting (FIG 5).

Thus, in the embodiment, the camera 18 and the navigation unit 20 are individually supplied with activating power immediately upon output of a display request within predetermined time period $\Delta t1$ following detection of completion of engine 16 starting. Therefore, activation of the camera image display unit CU can be started without waiting for supply of power from the accessory power supply VA even in a case of having an electric circuit of a type that activates accessory power supply VA after elapse of predetermined time period Δt1. Accordingly, a camera image can therefore be displayed on the monitor 21 immediately after the shifter is shifted to reverse, without impairing starting performance of the engine 16.

As a result, in a case where a camera image display request is output owing to the reverse switch 27 being turned ON simultaneously with an engine start command, for example, when a clutch pedal is depressed and the key switch 12 operated to start position in a reverse-selected state of a manual transmission, a camera image can be displayed within reference time period Δt0 following shifting of the shifter to reverse speed stage. Therefore, the driver can view a camera image after engine starting and immediately start driving the vehicle in reverse, and the camera image display requirement can be satisfied with ample time to spare.

(2) The camera image display apparatus 100 includes an onboard battery 10, an accessory power supply VA and an ignition power supply VI that branch from the battery 10 and output the activating signal Sa to the camera image display unit CU (navigation unit 20) (FIG. 1). Moreover, the ECU 19, the branch circuit 11 and the diodes 31 and 32 controls flow of electricity so as to output power of the ignition power supply VI (the activating signal Sa) to the navigation unit 20 at time t1 within the predetermined time period Δt1 from detection of completion of engine 16 starting, when the display request is output by the reverse switch 27 at time t1 (FIG. 4), and to output power of the accessory power supply VA (activating signal Sa) to the navigation unit 20 at time t2 after elapse of the time period Δt1 from detection of completion of engine starting, when the display request is not output within the predetermined time period Δt1 (FIG. 5).

Thus, when a display request is output within predetermined time period Δt1 following detection of engine start completion, power of the ignition power supply VI is used to command activation of the camera image display unit CU, whereby activation processing of the navigation unit 20 and camera 18 can be promptly started. Further, since supply of power from the accessory power supply VA is stopped until predetermined time period Δt1 has elapsed following detection of engine start completion, power of the battery 10 can be preferentially supplied to the starter motor at time of engine starting, thereby enabling improvement of engine 16 starting performance. Further, it is additionally possible to avoid supply of power from the accessory power supply VA to different electrical equipment just after engine start completion before voltage of the battery 10 adequately recovers, and thus the different electrical equipment can be stably operated with no voltage deficiency.

(3) The camera image display apparatus 100 includes an IG line 15 connected to ignition power supply VI, an ACC line 14 connected to accessory power VA, a connection line 30 connecting to the IG line 15 and the ACC line 14 and diodes 31 and 32 that allow flow of electricity from the IG line 15 to the ACC line 14, more specifically, flow of electricity through the ACC line 14 to the navigation unit 20 and prohibit flow of electricity from the ACC line 14 to the IG line 15. Moreover, the ECU 19 and branch circuit 11 control flow of electricity so as to output power of the ignition power supply VI (activating signal Sa) through the IG line 15, connection line 30 and diode 32 to the navigation unit 20 at time t1, and to output power of the accessory power supply VA (activating signal Sa) through the ACC line 14 to the navigation unit 20 at time t2 after elapse of the time period Δt1 when the display request is not output within the predetermined time period Δt1 following detection of completion of engine starting (FIGS. 1, 4 and 5).

By thus configuring the electric circuit including the ACC line 14 supplied with accessory power supply VA and the IG line 15 supplied with ignition power supply VI so as to output power of the ignition power supply VI through the IG line 15 and ACC line 14 to the navigation unit 20, need for circuit modification can be minimized. Particularly with respect to a configuration like that of the comparative example of FIG. 2, a slight modification of merely adding the connection line 30 and the pair of diodes 31 and 32 makes it possible to supply power from the ignition power supply VI to the navigation unit 20 only when accessory power supply VA is not being supplied.

(4) The camera image display apparatus 100 further includes a battery power supply VB that branches from the onboard battery 10 and supplies activating power to the camera image display unit CU (FIG. 1). The controller 22 controls flow of electricity so as to prohibit the battery power supply VB from supplying activating power to the camera image display unit CU until power of the ignition power supply VI or accessory power supply VA (activating signal Sa) is output to the camera image display unit CU (navigation unit 20) and to supply activating power from the battery power supply VB to the camera image display unit CU when power of ignition power supply VI or accessory power supply VA is output to the camera image display unit CU. Therefore, even in a configuration that, as in the present embodiment, activates the navigation unit 20 and camera 18 using battery power supply VB, camera images can be quickly displayed without degrading starting performance of the engine.

(5) The camera image display unit CU further includes an audio device (radio, speaker(s) 23 etc.) (FIG. 1). Although radio noise is apt to occur during engine starting in a configuration including such an audio device, occurrence of radio noise from the navigation unit 20 functioning as an audio device can be inhibited in the present invention because accessory power supply VA voltage rises after elapse of predetermined time period Δt1 following engine start completion.

Figure 6:
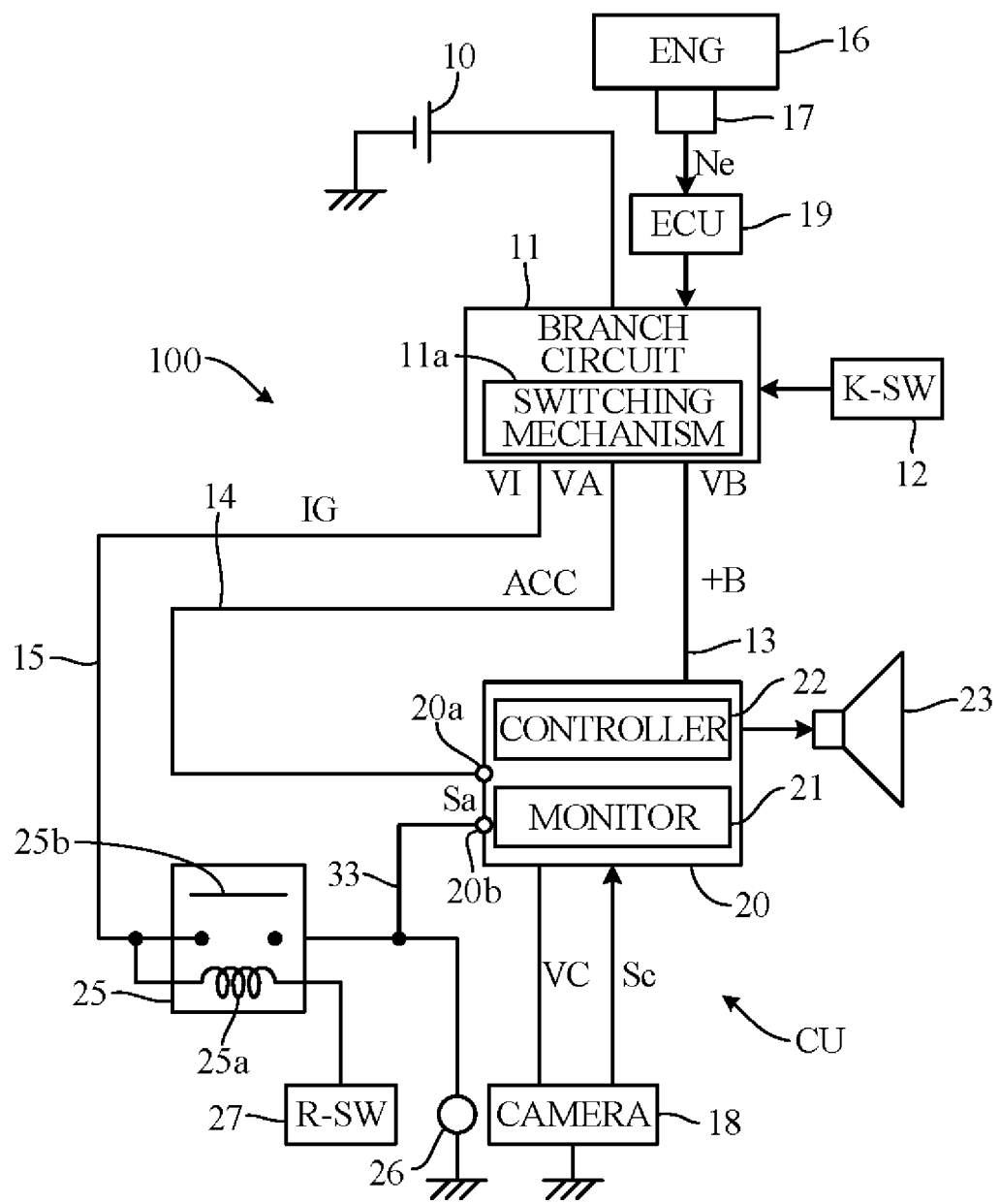
FIG. 6 is a diagram showing a modification of FIG. 1.

Various modifications of the above embodiment are possible. Some examples are explained in the following. FIG. 6 is a diagram showing a modification of the embodiment of FIG. 1. In FIG. 6, unlike in FIG. 1, the connection line 30 and diodes 31 and 32 are omitted and an input line 33 is added that branches from the IG line 15 on the downstream side of the relay 25 (from between the relay 25 and back lights 26) and extends to the navigation unit 20. The input line 33 is connected to an input terminal 20b of the navigation unit 20.

The controller (processor) 22 determines whether the activating signal Sa has input to one of the input terminals 20a and 20b, and upon determining input of the activating signal Sa, it permits supply of battery power supply VB through the +B line 13 to the navigation unit 20. Therefore, when the activating signal Sa is input through the input terminal 20b owing to the relay switch 25b turning ON, activation processing of the navigation unit 20 is started. And after completion of activation, image display on the monitor 21 is switched to camera image display. In other words, in this modified configuration, image display switching is not performed in response to input of a camera 18 image signal but is triggered by input of the activating signal Sa through the input terminal 20b. This enables rapid switching of image display on the monitor 21.

Although in the above embodiment, an example is explained of displaying images taken by a rear camera on the monitor 21, the camera 18 of FIG. 1 is not limited to the rear camera and can be replaced any of various other kinds of cameras, such as a front camera photographing forward of the vehicle or a side camera photographing sideways of the vehicle. Therefore, a display request of a camera image can also be output by other than the reverse switch 27. In other words, a camera to which the present invention is applied is not limited to that described in the foregoing but can be of any type insofar as it is mounted on the vehicle and photographs surroundings of the vehicle. Moreover, a configuration of a display request output part for outputting a display request of the camera image is also not limited to the above configuration.

Although in the above embodiment, camera images are displayed on the monitor 21 of the navigation unit 20, a monitor is not limited to this configuration. For instance, instead of displaying camera images on the navigation unit 20, it is possible to display them on a monitor of some other unit (e.g., the audio device) activated by power from the onboard battery (secondary battery). Therefore, a display unit can be constituted by a monitor and a camera, without providing the navigation unit 20. In the above embodiment the camera image display unit CU serving as a display unit is constituted by the navigation unit 20 and the camera 18 supplied with activating power (camera power VC) via the navigation unit 20. However, a display unit is not limited to this configuration. For example, activating power can be supplied to the camera 18 without being passed through the navigation unit 20. In this case, the function of the controller 22 can be incorporated in the ECU 19, for example, and the navigation unit 20 eliminated.

In the above embodiment, power is supplied to the camera image display unit CU from the ignition power supply VI (first power supply), accessory power supply VA (second power supply) and battery power supply VB (third power supply). Although battery power supply VB is, in particular, used as an activating power supply of the navigation unit 20 and camera 18, a power supply part is not limited to this configuration. The accessory power supply VA or the ignition power supply VI can be used instead of the battery power supply VB as an activating power supply of a monitor. For example, it is possible to supply power of the accessory power supply VA to a monitor instead of the activating signal Sa or as the activating signal Sa, and also supply it as activating power. It is possible to use battery power supply VB as an activating power supply of a monitor and use accessory power supply VA or ignition power supply VI as an activating power supply of a camera.

In the above embodiment, the ECU 19, branch circuit 11, controller 22 and diodes 31 and 32 are used to control supply of power from ignition power supply VI, accessory power supply VA and battery power supply VB to the camera image display unit CU. More specifically, by the ECU 19, branch circuit 11 and diodes 31 and 32 serving as a power supply control unit, when a display request is output at time t1 (first time point) within predetermined time period Δt1 following engine start completion, power (activating signal Sa) of ignition power supply VI (first power supply) is output to navigation unit 20 at time t1, as shown in FIG. 4, and when a display request is not output at time t2 (second time point) after elapse of time period Δt1, power (activating signal Sa) of accessory power supply VA (second power supply) is output to the navigation unit 20 at time t2, as shown in FIG. 5.

In particular, the ACC line 14 and the IG line 15 are connected through the connection line 30 and the diodes 31 and 32 serving as a path connecting portion so as to allow flow of electricity from the IG line 15 (first path) to the ACC line 14 (second path) and prohibit flow of electricity from the ACC line 14 to the IG line 15. However, the configuration of a power supply control unit for controlling flow of electricity from a power supply unit (power supplies VB, VA and VI) to a camera and monitor is not limited to the above configuration and various modifications, such as that shown in FIG. 6, for example, are conceivable. Therefore, the configuration of a power supply control unit is not limited to that described in the foregoing.

In the above embodiment, a key switch 12 is provided to be operated to an off position, an IG position (first position), an ACC position (second position) or a start position (third position) by a driver. However, the configuration of a switch part is not limited to the above configuration. In the above embodiment, a circuit between the battery 10 and power supplies (the ignition power supply VI, the accessory power supply VA and the battery power supply VB) is switched in response to an operation of the key switch 12. However, the configuration of a switching circuit is not limited to the above configuration. In other words, the configuration of a power supply control unit including a switch part and switching circuit is not limited to the above configuration.

The above embodiment can be combined as desired with one or more of the above modifications. The modifications can also be combined with one another.

According to the present invention, when a display request of a camera image is output within a predetermined time from a completion of an engine starting, power is immediately supplied to a display unit including a camera and monitor. Therefore, it is possible to promptly display the camera image without degrading starting performance.

Above, while the present invention has been described with reference to the preferred embodiments thereof, it will be understood, by those skilled in the art, that various changes and modifications may be made thereto without departing from the scope of the appended claims.

What is claimed is:

1. A camera image display apparatus, comprising:
    a display unit including a camera mounted on a vehicle to photograph surroundings of the vehicle and a monitor configured to display a camera image taken by the camera;
    a display request output part configured to output a display request of the camera image;
    a power supply part configured to supply an electrical power to the display unit; and
    a power supply control unit configured to control a flow of an electricity from the power supply part to the display unit,
    wherein the power supply control unit controls the flow of the electricity so as to supply an activating power from the power supply part to the display unit at a first time point within a predetermined time from a completion of a start of an engine mounted on the vehicle, when the display request is output at the first time point by the display request output part, and so as to supply the activating power from the power supply part to the display unit at a second time point after a lapse of the predetermined time, when the display request is not output within the predetermined time from the completion of the start of the engine.

2. The camera image display apparatus according to claim 1, wherein the power supply part includes a battery, and a first and second power supplies branched from the battery to output an activating signal to the display unit, and the power supply control unit controls the flow of the electricity so as to output the activating signal from the first power supply to the display unit at the first time point, when the display request is output at the first time point by the display request output part, and so as to output the activating signal from the second power supply to the display unit at the second time point, when the display request is not output at the second time point.

3. The camera image display apparatus according to claim 2, wherein the power supply control unit includes a first path connected to the first power supply, a second path connected to the second power supply, and a path connecting portion configured to connect the first path and the second path, allow a flow of an electricity from the first path to the second path and prohibit a flow of an electricity from the second path to the first path, and controls the flow of the electricity so as to output the activating signal from the first power supply to the display unit through the first path and the path connecting portion at the first time point, and output the activating signal from the second power supply to the display unit through the second path.

4. The camera image display apparatus according to claim 2, wherein the first power supply is an ignition power supply for driving the engine and the second power supply is an accessory power supply.

5. The camera image display apparatus according to claim 2, wherein the power supply part further includes a third power supply branched from the battery to supply the activating power to the display unit, and the power supply control unit controls the flow of the electricity so as to prohibit the third power supply from supplying the activating power to the display unit until the activating signal from the first power supply or the second power supply is output to the display unit, and to supply the activating power from the third power supply to the display unit, when the activating signal from the first power supply or the second power supply is output to the display unit.

6. The camera image display apparatus according to claim 5, wherein the power supply control unit includes a switch part operated to an off position, a first position or a second position by a driver and a switching circuit configured to switch a circuit in accordance with an operation of the switch part, and the switching circuit switches the circuit so as to connect the battery to the third power supply when the switch part is operated to the off position, connect the battery to the first power supply, the second power supply and the third power supply when the switch part is operated to the first position, and connect the battery to the second power supply and the third power supply when the switch part is operated to the second position.

7. The camera image display apparatus according to claim 6, wherein the switch part is configured to further be operated to a third position for instructing the start of the engine, and the switching circuit is switched so as to disconnect the battery and the second power supply when the switch part is operated from the second position to the third position.

8. The camera image display apparatus according to claim 1, wherein the display unit further includes an audio device.

9. The camera image display apparatus according to claim 1, wherein the camera is a rear camera configured to photograph a rear of the vehicle, and the display request output part includes a shifter configured to input an instruction of a backward travelling, and outputs the display request when the instruction of the backward travelling is input by the shifter.

* * * * *